H. J. WALTON & C. M. NERBER.
DEVICE FOR CONTRACTING PISTON RINGS.
APPLICATION FILED APR. 17, 1914.

1,103,717.

Patented July 14, 1914.

Inventors
Howard J. Walton,
Cecil M. Nerber.

UNITED STATES PATENT OFFICE.

HOWARD J. WALTON AND CECIL M. NERBER, OF TITUSVILLE, PENNSYLVANIA.

DEVICE FOR CONTRACTING PISTON-RINGS.

1,103,717. Specification of Letters Patent. Patented July 14, 1914.

Application filed April 17, 1914. Serial No. 832,521.

*To all whom it may concern:*

Be it known that we, HOWARD J. WALTON and CECIL M. NERBER, citizens of the United States, residing at Titusville, in the county of Crawford and State of Pennsylvania, have invented certain new and useful Improvements in Devices for Contracting Piston-Rings, of which the following is a specification.

This invention relates to devices for compressing or contracting piston rings while in place on the piston, so that the whole may be readily slipped into the cylinder, and its object is to provide a simple and efficient device of this kind which is adjustable to piston rings of different diameters. This object is attained by means of a novel combination and arrangement of parts to be hereinafter described and claimed, reference being had to the accompanying drawing, in which—

Figure 1:
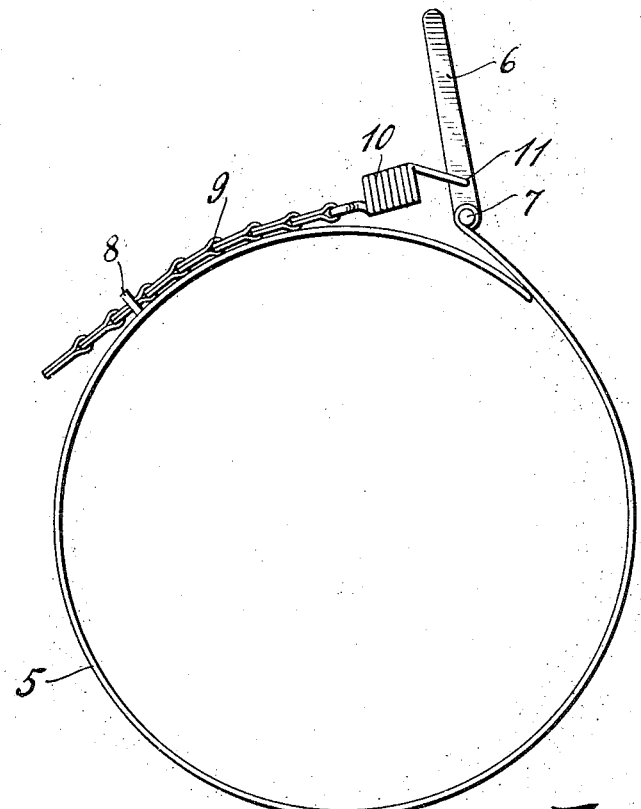
Figure 2:
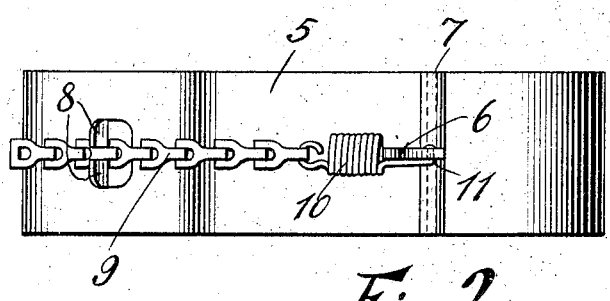

Figure 1 is an elevation of the device, and Fig. 2 is a plan view thereof.

In carrying out the invention there is provided an annular flexible band 5 wide enough to engage all the rings at one time, in order that they may be compressed at one operation. The band is split or divided, and to one end is pivoted a lever 6 as indicated at 7. Adjacent to the other end of the band, on the outside thereof, are located lugs 8 which may be tongues struck up from the band. These lugs are for the purpose of holding a chain 9 to one end of which is connected a coiled spring 10, which latter, in turn, is connected to the lever 6 as indicated at 11.

The band 5 forms a flexible gripping device and by swinging the lever 6 in a direction to draw the two ends of the band together, the band contracts around the piston ring or rings and compresses the same to facilitate insertion thereof, with the piston, into the cylinder. The band is placed to encircle the piston ring or rings, and it is then contracted until the rings come flush with the surface of the piston.

The ends of the band 5 overlap as shown in Fig. 1 so that the diameter of the band may be increased to suit the diameter of the piston rings, and the chain 9 is adjustably connected to the lugs 8. It will therefore be evident that the device is adapted for different sizes of piston rings.

The lever 6 may be locked after the band 5 is contracted by swinging it over far enough to throw the point 11, where the spring 10 is attached to the lever, inside the pivot 7 of the latter.

If the rings are pinned to the piston, they can be placed with the pins properly seating in the recesses, and all the rings can be positively clamped in their respective positions.

The spring connection 10 between the chain 9 and the lever 6 is provided to adapt the device for piston rings of different diameters. Without the spring connection the chain adjustment might not draw the piston rings in sufficiently on one link, the next being so short as not to allow the lever to lock. The spring also guards against an excess compression which would prevent the device from slipping freely on the piston when the latter is inserted into the cylinder.

We claim:

1. A device of the character described comprising a split flexible band, a lever pivoted to one end of the band, a chain anchored to the other end of the band, and a resilient connection between the chain and the lever.

2. A device of the character described comprising a split flexible band the ends of which overlap a lever pivoted to one end of the band, a chain anchored to the other end of the band, and a resilient connection between the chain and the lever.

In testimony whereof we affix our signatures in presence of two witnesses.

HOWARD J. WALTON.
CECIL M. NERBER.

Witnesses:
ROBT. A. KERR,
HELEN J. DARRAH.